(12) United States Patent
Hoffman

(10) Patent No.: US 10,344,830 B2
(45) Date of Patent: Jul. 9, 2019

(54) MULTI-SPEED TRANSMISSION

(71) Applicant: Ford Global Technologies, LLC, Dearborn, MI (US)

(72) Inventor: Donald Edward Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 15/426,393

(22) Filed: Feb. 7, 2017

(65) Prior Publication Data

US 2018/0223958 A1 Aug. 9, 2018

(51) Int. Cl.
*F16H 3/66* (2006.01)

(52) U.S. Cl.
CPC ....... *F16H 3/66* (2013.01); *F16H 2200/0043* (2013.01); *F16H 2200/0086* (2013.01); *F16H 2200/2012* (2013.01); *F16H 2200/2048* (2013.01)

(58) Field of Classification Search
CPC ............... F16H 3/66; F16H 2200/0043; F16H 2200/0086; F16H 2200/2012; F16H 2200/2048
See application file for complete search history.

(56) References Cited

U.S. PATENT DOCUMENTS

| | | | |
|---|---|---|---|
| 7,150,696 B2 * | 12/2006 | Bucknor | F16H 3/66 475/296 |
| 7,597,020 B2 * | 10/2009 | Baldwin | B60W 10/113 74/330 |
| 7,736,262 B2 | 6/2010 | Suh | |
| 8,298,111 B2 | 10/2012 | Kato et al. | |
| 8,403,803 B2 | 3/2013 | Gumpoltsberger et al. | |
| 8,465,390 B2 * | 6/2013 | Brehmer | F16H 3/66 475/282 |
| 8,517,885 B2 | 8/2013 | Shim et al. | |
| 8,715,129 B1 | 5/2014 | Coffey | |
| 8,784,259 B2 | 7/2014 | Shim et al. | |
| 8,920,281 B2 | 12/2014 | Mellet et al. | |
| 8,936,529 B2 * | 1/2015 | Kaltenbach | F16H 37/042 475/271 |
| 9,175,748 B2 | 11/2015 | Goleski et al. | |
| 9,217,493 B2 | 12/2015 | Lipped | |
| 9,279,478 B2 | 3/2016 | Mellet et al. | |
| 9,347,530 B2 | 5/2016 | Hart | |
| 9,523,412 B2 | 12/2016 | Lee et al. | |
| 9,618,092 B2 * | 4/2017 | Hwang | F16H 3/66 |
| 9,822,845 B2 * | 11/2017 | Lee | F16H 3/66 |
| 9,841,082 B2 * | 12/2017 | Lee | F16H 3/66 |
| 9,995,368 B2 * | 6/2018 | Kook | F16H 3/66 |
| 10,001,198 B2 * | 6/2018 | Hwang | F16H 3/66 |

(Continued)

*Primary Examiner* — Jacob S. Scott
*Assistant Examiner* — Tinh T Dang
(74) *Attorney, Agent, or Firm* — David Kelley; Brooks Kushman, P.C.

(57) ABSTRACT

A transmission gearing arrangement includes four simple planetary gear sets, three brakes, and four clutches. The transmission produces two reverse gear ratios and twelve forward speed ratios in response to engagement of the brakes in clutches in combinations of three. The transmission is suitable for use with a range selector. In a low range, one of the reverse ratios and all twelve of the forward ratios are utilized. In a high range, the other reverse ratio and eleven of the forward ratios are utilized.

7 Claims, 2 Drawing Sheets

(56) References Cited

U.S. PATENT DOCUMENTS

| | | | |
|---|---|---|---|
| 10,024,398 B2* | 7/2018 | Kook | F16H 3/66 |
| 2012/0270694 A1* | 10/2012 | Seo | F16H 3/66 |
| | | | 475/276 |
| 2014/0080656 A1 | 3/2014 | Lippert | |
| 2014/0179487 A1* | 6/2014 | Thomas | F16H 3/62 |
| | | | 475/275 |
| 2014/0256499 A1 | 9/2014 | Lippert et al. | |
| 2015/0087470 A1 | 3/2015 | Takagi et al. | |
| 2015/0267781 A1* | 9/2015 | Meyer | F16H 3/666 |
| | | | 475/275 |
| 2016/0245372 A1 | 8/2016 | Hart | |
| 2016/0356351 A1* | 12/2016 | Lee | F16H 3/66 |

* cited by examiner

MULTI-SPEED TRANSMISSION

TECHNICAL FIELD

This disclosure relates to the field of automatic transmissions for motor vehicles. More particularly, the disclosure pertains to an arrangement of gearing elements, shift elements, and the interconnections among them and to the corresponding method of engaging the clutches to produce desired speed ratios.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Some vehicles also include a transfer case which directs power from the transmission to front and rear driveshafts. Some transfer cases include shiftable gearing that allow the transfer case to operate in a low range and in a high range. The high range is typically selected for on-road driving. The low range may be selected for off-road driving or other situations in which high torque or precise speed control are desired. One disadvantage of providing this functionality in a transfer case is that it is only available in four wheel drive vehicles. Another disadvantage is the transfer case gearing is often not capable of shifting between low range and high range while the vehicle is moving under engine power.

SUMMARY OF THE DISCLOSURE

Figure 1:
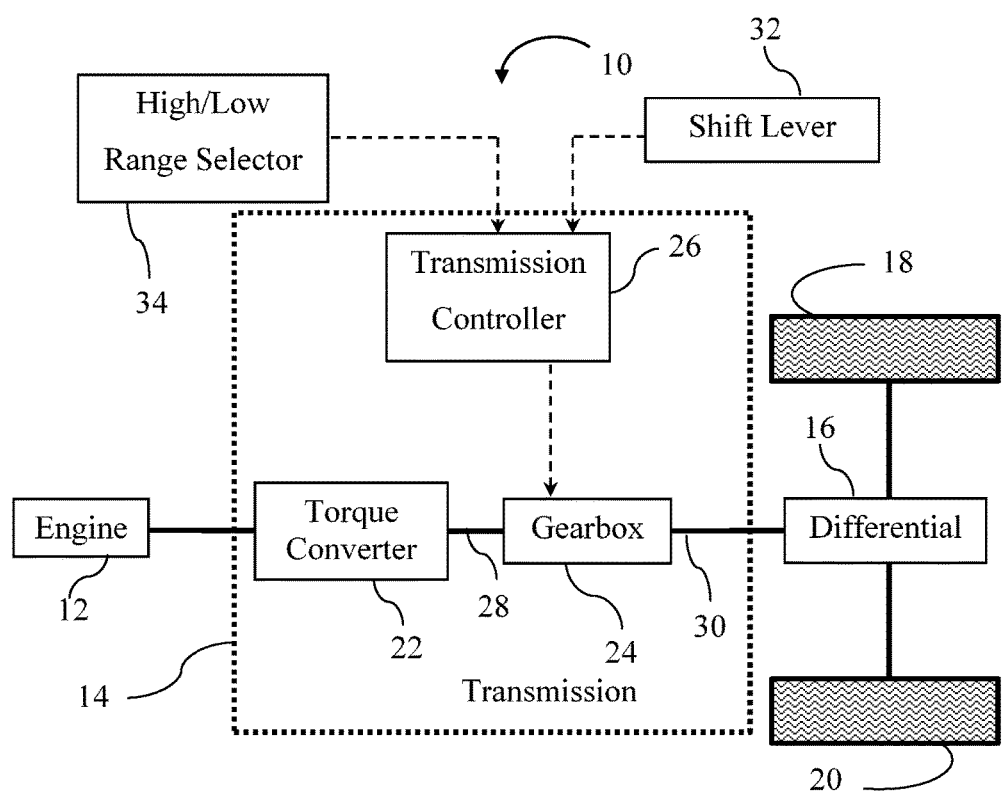
FIG. 1 is a schematic diagram of a vehicle powertrain.

A transmission includes four simple planetary gear sets. A second sun is fixedly coupled to an input. A third ring and a fourth carrier are fixedly coupled to an output. A first carrier is fixedly coupled to a second ring. A first ring is fixedly coupled to a third sun. A first brake may selectively hold the first carrier and the second ring against rotation. A second brake may selectively hold a first sun against rotation. A third brake may selectively hold a fourth sun against rotation. A first clutch may selectively couple the first sun to a second carrier. A second clutch may selectively couple the second carrier to the first ring and the third sun. A third clutch may selectively couple the input to the second carrier. A fourth clutch may selectively couple the input to the third carrier and the fourth ring. The transmission may also include a controller programmed to command engagement of various brakes and clutches in response to driver selection of either a high or low range and driver selection of either a reverse or forward drive mode. The controller may respond to driver selection of a low range and a reverse mode by commanding engagement of the first brake, the third brake, and the first clutch. The controller may respond to driver selection of a high range and the reverse mode by commanding engagement of the second brake, the third brake, and the first clutch. The controller may respond to driver selection of the low range and a forward drive mode by commanding engagement of the first brake, the third brake, and the second clutch while the output is stationary and then upshift by commanding coordinated engagement of the second brake and release of the first brake while the output is rotating. The controller may respond to driver selection of the high range and the forward drive mode by commanding engagement of the second brake, the third brake, and the second clutch while the output is stationary.

In another embodiment, a transmission includes first and second gearing arrangements, a clutch, and a brake. The first gearing arrangement is configured to alternately establish four positive speed ratios and two negative speed ratios between an input shaft and a first shaft. The controller may also be configured to selectively hold the first shaft against rotation while permitting the input shaft to rotate. The second gearing arrangement is configured to impose a fixed linear speed relationship among the first shaft, a second shaft, an output shaft, and a third shaft. The clutch selectively couples the input shaft to the second shaft. The brake selectively holds the third shaft against rotation. The transmission may also include a controller programmed to respond to driver selection of either a high or low range and driver selection of either a reverse or forward drive mode. The controller may respond to driver selection of a low range and a reverse mode by commanding engagement of the brake and commanding establishment of a first of the two negative speed ratios. The controller may respond to driver selection of a high range and the reverse mode by commanding engagement of the brake and commanding establishment of a second of the two negative speed ratios. The controller may respond to driver selection of the low range and a forward drive mode by commanding, while the output shaft is stationary, engagement of the brake and establishment of a first of the four positive speed ratios and then upshift by commanding the first gearing arrangement to upshift to a second of the four positive speed ratios while the output shaft is rotating. The controller may respond to driver selection of the high range and the forward drive mode by commanding, while the output shaft is stationary, engagement of the brake and establishment of the second of the four positive speed ratios. Finally, the controller may command engagement of the clutch, and command the first gearing arrangement to hold the first shaft against rotation.

In another embodiment, a transmission includes first and second gearing arrangements and a controller. The first gearing arrangement is configured to selectively establish first and second negative speed ratios between an input shaft and an intermediate shaft. The first gearing arrangement may be further configured to selectively establish first, second, third, and fourth positive speed ratios between the input shaft and the intermediate shaft. The second gearing arrangement is configured to impose a selective underdrive speed relationship between the intermediate shaft and an output shaft. The second gearing arrangement may be further configured to impose a selective linear speed relationship among the intermediate shaft, the input shaft, and the output shaft. The controller is programmed to respond to driver selection of a low range and a reverse mode by commanding the first gearing arrangement to establish the first negative speed ratio and commanding the second gearing arrangement to establish the underdrive speed relationship. The controller is further programmed to respond to driver selection of a high range and the reverse mode by commanding the first gearing arrangement to establish the second negative speed ratio and commanding the second gearing arrangement to establish the underdrive speed relationship. The controller may also be programmed to respond to driver selection of the low range and a forward drive mode by, while the output shaft is stationary, commanding the first gearing arrangement to establish the first positive speed ratio and commanding the second gearing arrangement to establish the underdrive speed relationship and, while the output shaft is rotating, command the first gearing arrangement to shift to the second positive speed ratio. The controller may also be programmed to respond to driver selection of the high range and the forward drive mode by, while the output shaft is stationary, commanding the first gearing arrangement to establish the second positive speed ratio and commanding the second gearing arrangement to establish the underdrive speed relationship.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotatable elements are fixedly coupled to one another if they are constrained to rotate at the same speed about the same axis in all operating conditions. Rotatable elements can be fixedly coupled by, for example, spline connections, welding, press fitting, or machining from a common solid. Slight variations in rotational displacement between fixedly coupled elements can occur such as displacement due to lash or shaft compliance. One or more rotatable elements that are all fixedly coupled to one another may be called a shaft. In contrast, two rotatable elements are selectively coupled by a shift element when the shift element constrains them to rotate at the same speed about the same axis whenever it is fully engaged and the rotatable elements are free to have distinct speeds in at least some other operating condition. A shift element that holds a rotatable element against rotation by selectively connecting it to the housing is called a brake. A shift element that selectively couples two or more rotatable elements to one another is called a clutch. Shift elements may be actively controlled devices such as hydraulically or electrically actuated clutches or brakes or may be passive devices such as one way clutches or brakes. Two rotatable elements are coupled if they are either fixedly coupled or selectively coupled.

A gearing arrangement is a collection of shafts and shift elements configured to impose specified speed relationships among the shafts. Some speed relationships, called fixed speed relationships, are imposed regardless of the state of any shift elements. Other speed relationships, called selective speed relationships, are imposed only when particular shift elements are fully engaged. The speed of a shaft is positive when the shaft rotates in one direction, negative when the shaft rotates in the opposite direction, and zero when the shaft is stationary. A proportional speed relationship exists between a first shaft and a second shaft when the ratio of their speeds is constrained to be a predetermined value. A proportional speed relationship between a first shaft and a second shaft is an underdrive relationship if the ratio of the second shaft speed to the first shaft speed is between zero and one. Similarly, a proportional speed relationship between a first shaft and a second shaft is an overdrive relationship if the ratio of the second shaft speed to the first shaft speed is greater than one. A linear speed relationship exists among an ordered list of shafts when i) the first and last shaft in the ordered list are constrained to have the most extreme speeds, ii) the speeds of the remaining shafts are each constrained to be a weighted average of the speeds of the first and last shafts, and iii) when the speeds of the shafts differ, they are constrained to be in the listed order, either increasing or decreasing.

FIG. 1 illustrates a vehicle powertrain 10. Solid lines indicate mechanical powerflow connections. Dotted lines indicate control signals. Power is provided by internal combustion engine 12. Transmission 14 conditions the speed and torque to better suit vehicle needs. Differential 16 divides the power between left and right drive wheels 18 and 20, allowing slight speed differences as the vehicle turns. Transmission 14 is further subdivided into a torque converter 22, a gearbox 24, and a controller 26. An impeller of torque converter 22 is driveably connected to engine 12. A gearbox input shaft 28 is driveably connected to a turbine of torque converter 22. A gearbox output shaft 30 is driveably connected to the differential 16. Controller 26 sends signals to gearbox 24 to engage various shift elements in order to establish particular transmission ratios. These signals may be electrical signals to solenoids in a valve body that cause pressurized fluid to be routed to apply chambers of the respective shift elements.

Controller 26 selects the transmission ratio based on a number inputs including a shift lever 32 and a range selector 34. The shift lever permits the driver to select between various transmission operating modes such as Park, Reverse, Neutral, and Drive. The term shift lever, as used in this document, includes alternate user interface features for selecting among Park, Reverse, Neutral, and Drive operating modes, such as a touchscreen. The range selector permits the driver to select between high and low operating ranges. In some vehicles, the range selector may also select whether all four wheels are powered or only two wheels are powered. Typically, high range is used for most driving situations. Low range may be used when extra torque is required or when precise speed control is required.

Figure 2:
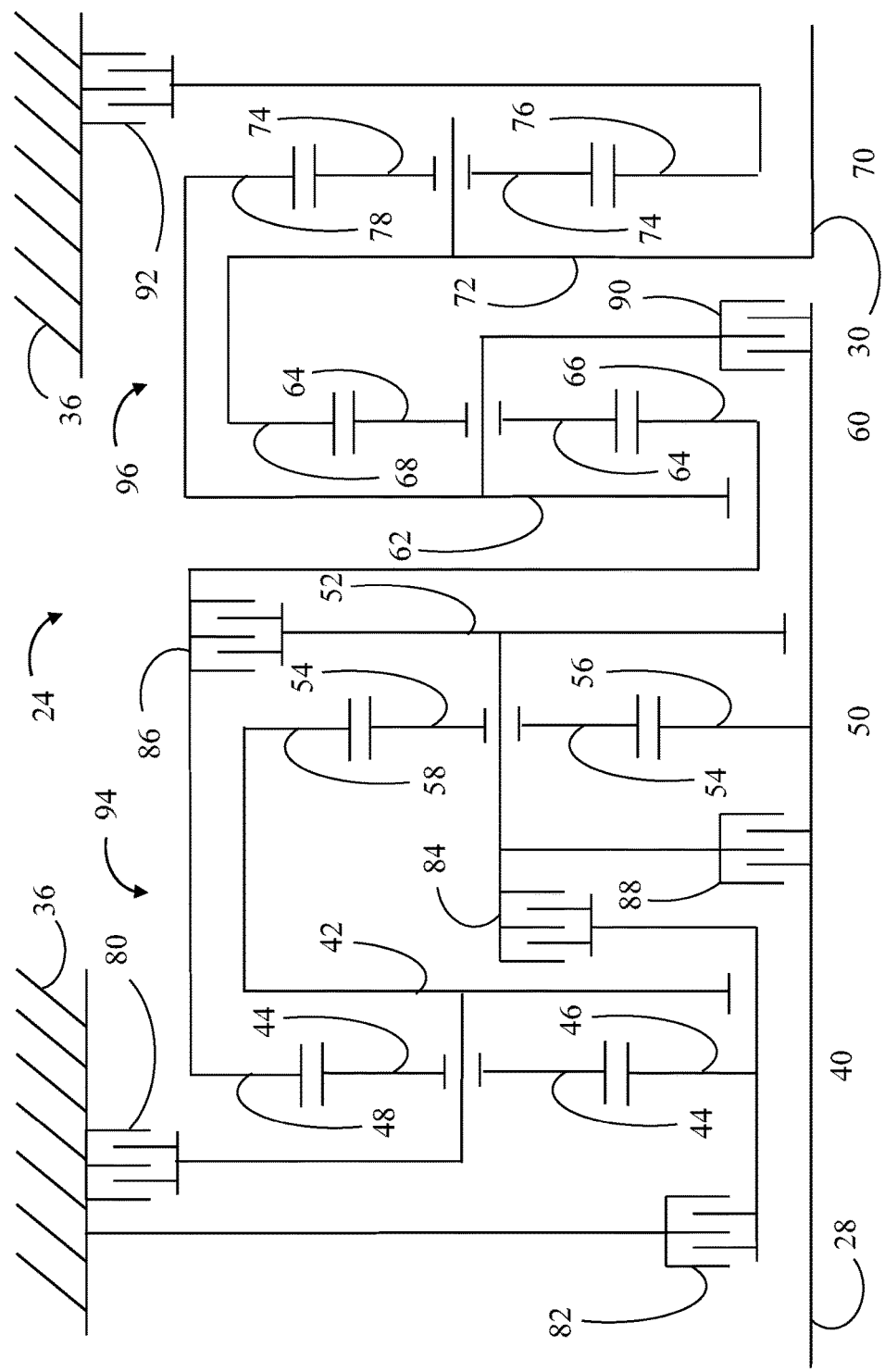
FIG. 2 is a schematic diagram of a transmission gearing arrangement.

FIG. 2 illustrates a gearbox 24 configured to establish 12 distinct forward transmission speed ratios and two distinct reverse transmission speed ratios. The gearbox utilizes seven shift elements including three brakes and four clutches. The shift elements are engaged in combinations of three to alternately establish the various speed ratios. The gearbox includes a housing 36 fixed to vehicle structure.

The transaxle of FIG. 2 utilizes four simple planetary gear sets 40, 50, 60, and 70. A planet carrier 42 rotates about a central axis and supports a set of planet gears 44 such that the planet gears rotate with respect to the planet carrier. External gear teeth on the planet gears mesh with external gear teeth on a sun gear 46 and with internal gear teeth on a ring gear 48. The sun gear and ring gear are supported to rotate about the same axis as the carrier. Gear sets 50, 60, and 70 are similarly structured. A suggested ratio of gear teeth for each planetary gear set is listed in Table 1.

TABLE 1

| | |
|---|---|
| Ring 48/Sun 46 | 1.80 |
| Ring 58/Sun 56 | 1.80 |
| Ring 68/Sun 66 | 2.40 |
| Ring 78/Sun 76 | 1.55 |

A simple planetary gear set is a type of gearing arrangement that imposes a fixed linear speed relationship among the sun gear, the planet carrier, and the ring gear. Other known types of gearing arrangements also impose a fixed linear speed relationship among three rotating elements. For example, a double pinion planetary gear set imposes a fixed linear speed relationship among the sun gear, the ring gear, and the planet carrier.

Sun gear 56 is fixedly coupled to input shaft 28. Ring gear 68 and carrier 72 are both fixedly coupled to output shaft 30. Carrier 42 is fixedly coupled to ring gear 58. Ring gear 48 is fixedly coupled to sun gear 66. Carrier 62 is fixedly coupled to ring gear 78. Brake 80 selectively holds carrier 42 and ring gear 58 against rotation. Sun gear 46 is selectively held against rotation by brake 82 and selectively coupled to carrier 52 by clutch 84. Clutch 86 selectively couples carrier 52 to ring gear 48 and sun gear 66. Input shaft 28 is selectively coupled to carrier 52 by clutch 88 and selectively coupled to carrier 62 and ring gear 78 by clutch 90. Brake 92 selectively holds sun gear 76 against rotation.

Gear sets 40 and 50 and shift elements 80, 82, 84, 86, and 88 form a first gearing arrangement 94 that is configured to alternately establish two negative speed ratios and four positive speed ratios between input shaft 28 and ring gear 48, as shown in Table 2 below. Additionally, engaging brakes 80 and 82 simultaneously holds ring gear 48 stationary while input shaft 28 is permitted to rotate. Note that engaging clutch 88 forces all three elements of gear set 50 (sun gear 56, carrier 52, and ring gear 58) to rotate at the same speed. In alternative embodiments, clutch 88 could be replaced by a clutch selectively coupling ring gear 58 to either carrier 52 or sun gear 56.

TABLE 2

| 80 | 82 | 84 | 86 | 88 | $\omega_{48}/\omega_{28}$ |
|---|---|---|---|---|---|
|  | X | X |  |  | −0.86 |
| X |  | X |  |  | −0.20 |
| X | X |  |  |  | 0.00 |
| X |  |  | X |  | 0.36 |
|  | X |  | X |  | 0.61 |
|  |  |  | X | X | 1.00 |
|  | X |  |  | X | 1.56 |

Gear sets 60 and 70 and shift elements 90 and 92 form a second gearing arrangement 96. Gear sets 60 and 70 collectively impose a fixed linear speed relationship among sun gear 66, the combination of carrier 62 and ring gear 78, output shaft 30, and sun gear 76. Engaging clutch 90 selectively establishes a linear speed relationship among sun gear 66, input shaft 28, and output shaft 30. Engaging brake 92 selectively establishes an underdrive relationship between sun gear 66 and output shaft 30.

As shown in Table 3, engaging the shift elements in combinations of three establishes twelve forward speed ratios and two reverse speed ratio between input 28 and output 30. An X indicates that the shift element is required to establish the speed ratio. An (X) indicates the clutch can be applied but is not required to establish a power flow path. In 5th gear, clutch 90 and brake 92 establish the power flow path between input 28 and output 30. Any one of the remaining shift elements can also be applied. Applying clutch 88 ensures that all single and two step shifts from 5th gear can be accomplished by engaging only one shift element and releasing only one shift element. When the gear sets have tooth numbers as indicated in Table 1, the speed ratios have the values indicated in Table 3.

TABLE 3

|  | 1$^{st}$ GA 94 | | | | | 2$^{nd}$ GA 96 | | | |
|---|---|---|---|---|---|---|---|---|---|
|  | 80 | 82 | 84 | 86 | 88 | 90 | 92 | Ratio | Step |
| R1 |  | X |  | X |  |  |  | X | −16.10 |
| R2 |  | X | X |  |  |  | X | −3.70 |  |
| 1$^{st}$ | X |  |  | X |  |  | X | 8.94 |  |
| 2$^{nd}$ |  | X |  | X |  |  | X | 5.25 | 1.70 |
| 3$^{rd}$ |  |  |  | X | X |  | X | 3.19 | 1.64 |
| 4$^{th}$ |  | X |  |  | X |  | X | 2.05 | 1.56 |
| 5$^{th}$ |  |  |  |  | (X) | X | X | 1.65 | 1.25 |
| 6$^{th}$ |  | X |  |  |  | X | X | 1.30 | 1.26 |
| 7$^{th}$ |  |  | X | X |  | X |  | 1.00 | 1.30 |
| 8$^{th}$ |  | X |  | X |  | X |  | 0.86 | 1.16 |
| 9$^{th}$ | X |  |  | X |  | X |  | 0.79 | 1.09 |
| 10$^{th}$ | X | X |  |  |  | X |  | 0.71 | 1.12 |
| 11$^{th}$ | X |  | X |  |  | X |  | 0.67 | 1.06 |
| 12$^{th}$ |  | X | X |  |  | X |  | 0.56 | 1.19 |

When range selector 34 is set to high range, controller 26 may shift the gearbox according to Table 4. In response to driver selection of Reverse via shift lever 32, controller 26 commands engagement of brake 82 and clutch 84 of the first gearing arrangement to establish a first negative speed ratio between input shaft 28 and sun gear 66. Additionally, controller 26 commands engagement of brake 92 to establish an underdrive speed relationship between sun gear 66 and output shaft 30. (Some of these shift elements may already be engaged in which case controller 26 continues to command engagement.) In response to driver selection of Drive via shift lever 32 while the vehicle is stationary, controller 26 commands engagement of brake 82 and clutch 86 of the first gearing arrangement to establish a first positive speed ratio between input shaft 28 and sun gear 66. Additionally, controller 26 commands engagement of brake 92 to establish an underdrive speed relationship between sun gear 66 and output shaft 30. This ratio is used to launch the vehicle from stationary. Once the vehicle is moving, the controller commands the coordinated release of brake 82 and engagement of clutch 88 to upshift the transmission. Additional upshifts are commanded in response to further acceleration according to Table 4.

TABLE 4

| | | 1st GA 94 | | | | 2nd GA 96 | | | |
|---|---|---|---|---|---|---|---|---|---|
| 32 | 80 | 82 | 84 | 86 | 88 | 90 | 92 | Ratio | Step |
| Park | X | X | | | | | X | | |
| Reverse | | X | X | | | | X | -3.70 | 70% |
| Neutral | | X | | | | | X | | |
| Drive 1st | | X | | X | | | X | 5.25 | |
| 2nd | | | | X | X | | X | 3.19 | 1.64 |
| 3rd | | X | | | X | | X | 2.05 | 1.56 |
| 4th | | | | | (X) | X | X | 1.65 | 1.25 |
| 5th | | X | | | X | X | | 1.30 | 1.26 |
| 6th | | | | X | X | X | | 1.00 | 1.30 |
| 7th | | X | | X | | X | | 0.86 | 1.16 |
| 8th | X | | | X | | X | | 0.79 | 1.09 |
| 9th | X | X | | | | X | | 0.71 | 1.12 |
| 10th | X | | X | | | X | | 0.67 | 1.06 |
| 11th | | X | X | | | X | | 0.56 | 1.19 |

When range selector 34 is set to low range, controller 26 may shift the gearbox according to Table 5. In response to driver selection of Reverse via shift lever 32, controller 26 commands engagement of brake 80 and clutch 84 of the first gearing arrangement to establish a second negative speed ratio between input shaft 28 and sun gear 66. This second negative speed ratio causes sun gear 66 to rotate slower (in absolute value) at a given input shaft speed than the first negative speed ratio. Additionally, controller 26 commands engagement of brake 92 to establish an underdrive speed relationship between sun gear 66 and output shaft 30. In response to driver selection of Drive via shift lever 32 while the vehicle is stationary, controller 26 commands engagement of brake 80 and clutch 86 of the first gearing arrangement to establish a second positive speed ratio between input shaft 28 and sun gear 66. This second positive speed ratio causes sun gear 66 to rotate slower at a given input shaft speed than the first positive speed ratio. Additionally, controller 26 commands engagement of brake 92 to establish an underdrive speed relationship between sun gear 66 and output shaft 30. This ratio is used to launch the vehicle from stationary. Once the vehicle is moving, the controller commands the coordinated release of brake 80 and engagement of brake 82 to upshift the transmission. Additional upshifts are commanded in response to further acceleration according to Table 5.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:
1. A transmission comprising:
   a first gearing arrangement configured to alternately establish four positive speed ratios and two negative speed ratios between an input shaft and a first shaft;

TABLE 5

| | | 1st GA 94 | | | | 2nd GA 96 | | | |
|---|---|---|---|---|---|---|---|---|---|
| 32 | 80 | 82 | 84 | 86 | 88 | 90 | 92 | Ratio | Step |
| Park | X | X | | | | | X | | |
| Reverse | X | | X | | | | X | -16.10 | 180% |
| Neutral | X | | | | | | X | | |
| Drive 1st | X | | | X | | | X | 8.94 | |
| 2nd | | X | | X | | | X | 5.25 | 1.70 |
| 3rd | | | | X | X | | X | 3.19 | 1.64 |
| 4th | | X | | | X | | X | 2.05 | 1.56 |
| 5th | | | | | (X) | X | X | 1.65 | 1.25 |
| 6th | | X | | | X | X | | 1.30 | 1.26 |
| 7th | | | | X | X | X | | 1.00 | 1.30 |
| 8th | | X | | X | | X | | 0.86 | 1.16 |
| 9th | X | | | X | | X | | 0.79 | 1.09 |
| 10th | X | X | | | | X | | 0.71 | 1.12 |
| 11th | X | | X | | | X | | 0.67 | 1.06 |
| 12th | | X | X | | | X | | 0.56 | 1.19 | a second gearing arrangement configured to impose a fixed linear speed relationship among the first shaft, a second shaft, an output shaft, and a third shaft, wherein the first shaft, second shaft, output shaft, and third shaft are free to have distinct speeds relative to one another in some operating conditions;

a clutch selectively coupling the input shaft to the second shaft; and a brake selectively holding the third shaft against rotation.

2. The transmission of claim 1 further comprising a controller programmed to:

in response to driver selection of a low range and a reverse mode, command engagement of the brake and command establishment of a first of the two negative speed ratios; and in response to driver selection of a high range and the reverse mode, command engagement of the brake and command establishment of a second of the two negative speed ratios.

3. The transmission of claim 2 wherein the controller is further programmed to:

in response to driver selection of the low range and a forward drive mode, command, while the output shaft is stationary, engagement of the brake and establishment of a first of the four positive speed ratios; and command the first gearing arrangement to upshift to a second of the four positive speed ratios while the output shaft is rotating.

4. The transmission of claim 3 wherein the controller is further programmed to:

in response to driver selection of the high range and the forward drive mode, command, while the output shaft is stationary, engagement of the brake and establishment of the second of the four positive speed ratios.

5. The transmission of claim 1 wherein the first gearing arrangement is further configured to selectively hold the first shaft against rotation while permitting the input shaft to rotate.

6. The transmission of claim 5 further comprising a controller programmed to:

command engagement of the clutch, and command the first gearing arrangement to hold the first shaft against rotation.

7. The transmission of claim 1 wherein the first gearing arrangement comprises:

a first planetary gear set configured to establish a fixed linear speed relationship among a fourth shaft, a fifth shaft, and the first shaft;

a second planetary gear set configured to establish a fixed linear speed relationship among the input shaft, a sixth shaft, and the fifth shaft;

a first shift element configured to selectively hold the fifth shaft against rotation;

a second shift element configured to selectively hold the fourth shaft against rotation;

a third shift element configured to selectively couple the fourth shaft to the sixth shaft;

a fourth shift element configured to selectively couple the sixth shaft to the first shaft; and a fifth shift element configured to selectively operatively couple the input shaft to the sixth shaft.

* * * * *